E. S. WHEELER.
COOKING UTENSIL.
APPLICATION FILED OCT. 11, 1912.
1,093,227.
Patented Apr. 14, 1914.
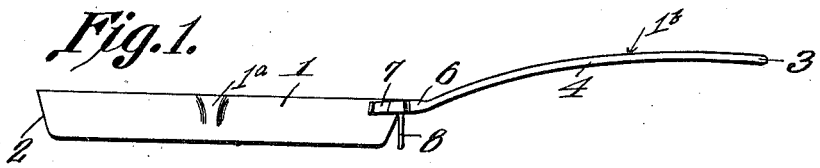
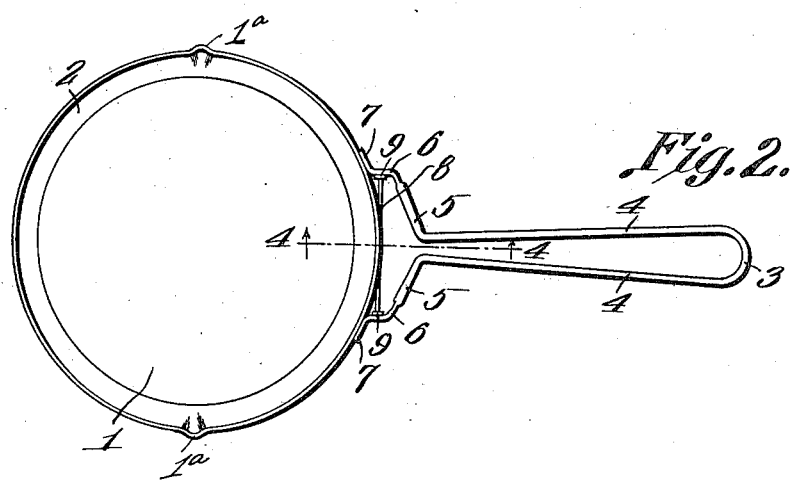
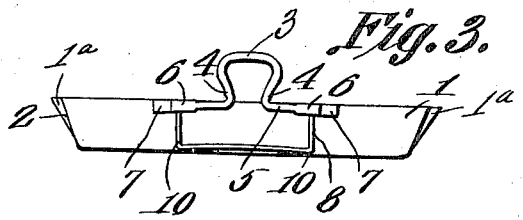
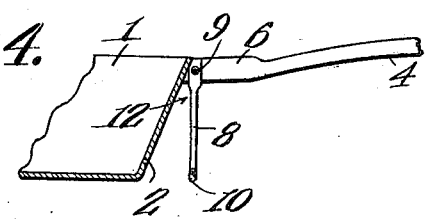
Witnesses
Enoch S. Wheeler,
Inventor
by
Attorneys

UNITED STATES PATENT OFFICE.

ENOCH S. WHEELER, OF MOLINE, ILLINOIS.

COOKING UTENSIL.

1,093,227.

Specification of Letters Patent. Patented Apr. 14, 1914.

Application filed October 11, 1912. Serial No. 725,331.

*To all whom it may concern:*

Be it known that I, ENOCH S. WHEELER, a citizen of the United States, residing at Moline, in the county of Rock Island and State of Illinois, have invented a new and useful Cooking Utensil, of which the following is a specification.

One object of the present invention is to provide a cooking utensil having a handle which will remain cool at all times.

Another object of the invention is to provide a cooking utensil having a handle which may be maintained in a sanitary and cleanly condition.

Another object of the invention is to provide a cooking utensil having a handle provided with a novel form of prop, adapted to prevent a tilting of the utensil.

The invention aims, further, to provide a cooking utensil handle which will be rigid.

The invention aims to increase the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed, can be made within the scope of what is claimed, without departing from the spirit of the invention.

In the drawings:—Figure 1 is a side elevation; Fig. 2 is a top plan; Fig. 3 is a rear elevation; and Fig. 4 is a section on the line 4—4 of Fig. 2.

In carrying out the invention there is provided a pan 1, ordinarily including a slanting wall 2. The pan 1 is provided with oppositely disposed pouring spouts 1ª, to facilitate the use of the utensil by right-handed and left-handed persons.

The invention further includes a loop-shaped, metallic handle 3 comprising converging arms 4 provided with lateral extensions 5. The handle 3 is curved slightly as at 1ᵇ, so that the handle may be easily retained in the hand of the operator. The rod or bar from which the handle 3 is fashioned, is ordinarily of circular cross section, but a rod of any other cross-section may be used; in any event, the extensions 5 are broadened and thinned, as indicated at 6, the greatest dimension of the portion 6 being vertically disposed, so as to increase the strength of the handle. The parts 6 may be described as being thinned parallel to the plane of the handle and being broadened transversely of the plane of the handle, meaning thereby that the horizontal dimension of each part 6 is decreased and that the vertical dimension of each part 6 is increased. The extensions 5 terminate in lateral feet 7 which are inclined to correspond with the wall 2 of the pan 1. The feet 7 are secured to the wall 2 of the pan 1 by brazing by electric welding, or in any other manner which will effect a rigid union between the handle 3 and the pan 1.

The invention further includes a loop-shaped prop 8, the ends 9 of which are flattened. The flattened ends 9 of the prop 8 are received between the broadened and thinned portions 6 of the extensions 5 of the handle 3, these parts being secured together by brazing, welding, or in any other manner which will effect a rigid union. In the present instance, the lowermost portion of the prop 8 is arched upwardly so as to define spaced supporting points 10. As indicated at 12, the prop 8 is set back from the wall 2 of the pan 1, so that one receptacle may be nested within another.

The handle 3 will remain cold, by reason of the fact that the feet 7 afford but small points of contact with the pan 1 and by reason of the further fact that the sides of the handle are spaced to permit a circulation of air. Consequently, heat cannot be conducted readily from the pan 1 into the handle. Owing to the fact that the feet 7 are secured to the wall 2 of the pan at points spaced widely apart, and owing to the fact that the handle includes the lateral extensions 5, the handle will possess great strength. Since the portions 6 of the handle are spaced apart, the prop 8 of one pan may be received between the parts 6 of a lower utensil, when the utensils are nested. The handle 3 and the prop 8 are fashioned from metal, the prop 8 being made from a tough material, so that the prop may be bent to any desired shape, manually. The handle herein disclosed may be manufactured at a trifling expense, and the construction is such that the utensil may be cleaned readily.

Having thus described the invention, what is claimed is:

1. A cooking utensil comprising a pan; a loop-shaped handle comprising arms secured to the pan; and a loop-shaped prop having its ends secured to the arms, the lowermost portion of the prop being upwardly arched to define spaced supporting points at the sides and at the bottom of the prop.

2. A cooking utensil comprising a pan; a U-shaped handle comprising arms rigidly secured to the outer face of the pan; and a U-shaped prop having its ends disposed between the arms and rigidly secured to the adjacent, inner faces only of the arms.

3. A cooking utensil comprising a pan; a loop-shaped handle including arms provided with lateral extensions, the extensions being thinned parallel to the plane of the handle and being broadened transversely of the plane of the handle, the ends of the extensions terminating in laterally extended feet secured to the pan; and a loop-shaped prop having flattened ends secured to the thinned parts of the extensions.

4. A cooking utensil comprising a pan; a U-shaped handle comprising arms secured to the pan; and a U-shaped prop, the extremities of which are secured to the arms.

5. A cooking utensil comprising a U-shaped wire handle including converging arms provided with diverging extensions, the ends of the extensions being approximately parallel and terminating in laterally extended feet; a pan secured to the feet; and a prop supported by the approximately parallel ends of the extensions.

In testimony that I claim the foregoing as my own, I have hereto affixed my signature in the presence of two witnesses.

ENOCH S. WHEELER.

Witnesses:
I. WIND,
W. V. JAMIESON.